United States Patent [19]
Krasnov

[11] 3,922,728
[45] Dec. 2, 1975

[54] ARTIFICIAL CRYSTALLINE LENS

[76] Inventor: Mikhail Mikhailovich Krasnov, ulitsa Vesnina 30, kv. 12, Moscow, U.S.S.R.

[22] Filed: Aug. 15, 1974

[21] Appl. No.: 497,638

[52] U.S. Cl. .................................................. 3/13
[51] Int. Cl.² ..................... A61F 1/16; A61F 1/24
[58] Field of Search ..................... 3/13, 1; 351/160

[56] References Cited
UNITED STATES PATENTS 3,673,616  7/1972  Fedorov et al............................ 3/13

*Primary Examiner*—Ronald L. Frinks
*Attorney, Agent, or Firm*—Waters, Schwartz & Nissen

[57] ABSTRACT

An artificial crystalline lens intended to be attached to the ciliary border area, outside the pupil area, said artificial crystalline lens comprising an optical lens having a supporting leg with a stepped bend intended to be introduced into a hole in the iris for attachment of said optical lens to the ciliary border area. At the opposite edge of said optical lens there is a seam receiving means for attaching said optical lens to the iris.

1 Claim, 5 Drawing Figures

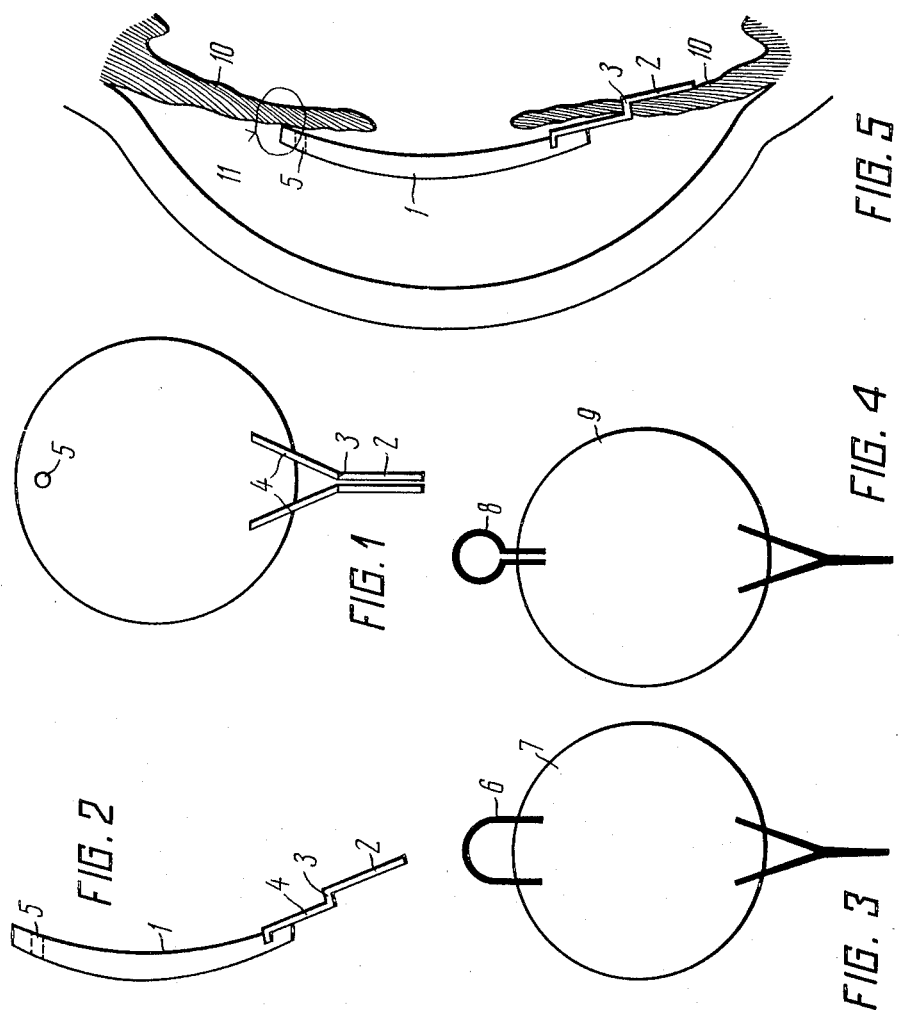

ARTIFICIAL CRYSTALLINE LENS

The present invention relates to ophthalmolgy and, more specifically, to artificial lenses to remedy optical defects of the eye, primarily in cases of aphacia.

There is known an artificial crystalline lens constructed as an optical lens with means for attaching said optical lens to the iris, in the ciliary border area and outside the pupil area, said means being made in the form of two or three supporting legs, each said leg having a stepped bend in its middle portion, said legs being intended to be passed through openings made in the iris. Each supporting leg is attached to the edge of said optical lens with the aid of two strap means located in the plane of the optical lens and intended to rule out rotation of said lens about the supporting leg axis after the artificial crystalline lens has been installed in the eye.

The above artificial lens is installed in the eye with the aid of complicated implantation techniques. In addition, the design of this artificial lens does not exclude the possibility of an installed lens being shifted by gravity relative to the vertical eye axis.

It is an object of the present invention to provide an artificial lens which would facilitate and make more reliable its attachment to the ciliary border area.

The foregoing object is attained by providing an artificial crystalline lens intended for attachment to the ciliary border area, outside the pupil area, said artificial lens comprising an optical lens with means for attaching said optical lens to the iris, in which artificial lens the optical lens attachment means are made, according to the invention, in the form of a supporting leg with a stepped bend, said leg being intended to be passed through an opening in the iris and being secured to the edge of said optical lens, and a seam receiving means for attaching said optical lens to the iris, the latter means being located at the edge of said optical lens.

The proposed artificial crystalline lens is advantageous over that of the prior art in that it is easy to manufacture, in that it simplifies the operative procedure, ensures reliable attachment of the artificial lens to the ciliary border area, reduces traumatism of eye tissues, and, finally, in that it minimizes the danger of complicative factors in the course of the operation, and of postoperative complications.

The invention practically rules out the possibility of dislocating the artificial lens and that of a contact of its supporting leg with the endothelium of the cornea and subsequent dystrophy. Another important advantage of the proposed artificial lens is that it has no adverse effects upon the functions and shape of the pupil. The proposed artificial lens may be employed to remedy inherent and acquired defects of the iris.

Other objects and advantages of the present invention will become more apparent from the following detailed description of exemplary embodiments thereof when read in conjunction with the accompanying drawings, wherein:

FIG. 1 shows an artificial crystalline lens in accordance with the invention;

FIG. 2 shows same (side view);

FIG. 3 shows an alternative embodiment of the artificial crystalline lens in accordance with the invention;

FIG. 4 shows another alternative embodiment of the artificial crystalline lens of the present invention;

FIG. 5 shows the way the artificial crystalline lens of the present invention is attached to the ciliary border area, outside the pupil area.

Referring now to the accompanying drawings, the main component of the proposed artificial lens is an optical lens 1 (FIGS. 1 and 2) made from a biologically inert polymer material, for example, methylmethacrylate. Said optical lens has a diameter of 5 to 8 mm and an optical power sufficient to rectify the optical defects of the eye. The lens 1 is provided with means for attaching said lens 1 to the iris, at the ciliary border area, said lens attachment means including a supporting leg 2 and a seam means located at the opposite edge of the lens 1. The supporting leg 2 is made from tantalum wire or some other biologically inert material (platimun, gold, etc.), the width of said supporting leg being from 0.1 to 0.3 mm.

The supporting leg 2 has a stepped bend 3 located approximately in the middle portion of said leg. The supporting leg 2 is positioned radially in relation to the lens 1 and is attached to the edge of the lens 1 with the aid of two straps 4 located in the plane of the lens 1 so as to rule out rotation of the lens 1 installed in the eye about the axis of the supporting leg 2. At the edge of the lens 1, which is opposite to the location of the supporting leg 2, there is a seam receiving means to attach the lens 1 to the iris, outside the pupil area. There may be several versions of the latter means. Its function may be performed, for example, by a through hole 5 made in the edge of the lens 1 which is opposite to the location of the supporting leg 2. There may by a number of through holes for attachment of the optical lens; in this case the holes are arranged along the periphery of said optical lens (not shown).

In order to reduce the overall lens diameter, the seam receiving means may be made in the form of a loop 6 (FIG. 3) secured to a lens 7, or a profiled protrusion 8 (FIG. 4) attached to a lens 9.

To install the proposed artificial lens, its supporting leg 2 (FIG. 5) is passed through a hole made in the lower ciliary border area so that the stepped bend 3 may rest upon an iris 10.

The upper portion of the lens 1 is attached to the ciliary border area of the iris 10 with the aid of a conventional seam 11 passed through the hole 5 in the lens 1, which rules out the shifting of the lens 1 in relation to the vertical axis of the eye.

The lense 7 (FIG. 3) and the lens 9 (FIG. 4) are fixed in a similar manner, with the seam passing through the loop 6 (FIG. 3) or the profiled protrusion 8 (FIG. 4).

What is claimed is:

1. An artificial crystalline lens intended to be attached to the ciliary border area in the anterior chamber, outside the pupil area, said artificial crystalline lens comprising: an optical lens; a supporting leg having one end attached adjacent a peripheral edge of said lens and extending radially outwardly to a terminal free opposite end, said supporting leg having a stepped bend portion intermediate said ends which is spaced outwardly from said peripheral edge, which leg serves for the attachment of said optical lens and is intended to be introduced into a hole made in the iris outside the pupil area; and a seam receiving means for the attachment of said optical lens to the iris, said means being located at the edge of said optical lens which is opposite to the location of said supporting leg.

* * * * *